United States Patent
Shimada et al.

(10) Patent No.: US 7,841,434 B2
(45) Date of Patent: Nov. 30, 2010

(54) ELECTRIC DRIVE SYSTEM FOR VEHICLE, ELECTRIC CONTROL SYSTEM FOR VEHICLE, ELECTRIC DRIVE METHOD FOR VEHICLE

(75) Inventors: Keizo Shimada, Hitachi (JP); Yasuhiro Kiyofuji, Hitachi (JP); Naoshi Sugawara, Hitachi (JP); Kazuhiro Imaie, Hitachi (JP); Shintarou Oku, Hitachi (JP); Takashi Yagyu, Ushiku (JP)

(73) Assignees: Hitachi, Ltd., Tokyo (JP); Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 12/463,665

(22) Filed: May 11, 2009

(65) Prior Publication Data

US 2009/0218966 A1    Sep. 3, 2009

Related U.S. Application Data

(62) Division of application No. 11/297,490, filed on Dec. 9, 2005, now abandoned.

(30) Foreign Application Priority Data

Dec. 10, 2004 (JP) .............................. 2004-358752

(51) Int. Cl.
*B60W 20/00* (2006.01)
(52) U.S. Cl. ............... 180/65.27; 180/65.1; 903/947
(58) Field of Classification Search ............... 180/65.1, 180/65.265, 65.27, 65.275, 65.31; 903/947; 310/112
See application file for complete search history.

(56) References Cited

U.S. PATENT DOCUMENTS

| 2,085,275 | A |   | 6/1937 | Schmidt |
|---|---|---|---|---|
| 4,095,664 | A |   | 6/1978 | Bray |
| 4,239,978 | A |   | 12/1980 | Kofink |
| 4,588,040 | A |   | 5/1986 | Albright et al. |
| 5,289,100 | A | * | 2/1994 | Joseph ........................ 318/799 |
| 5,368,116 | A |   | 11/1994 | Iijima et al. |
| 5,507,153 | A | * | 4/1996 | Seto et al. ...................... 62/133 |
| 5,635,805 | A |   | 6/1997 | Ibaraki et al. |
| 5,747,959 | A | * | 5/1998 | Iijima et al. .................. 318/762 |

(Continued)

FOREIGN PATENT DOCUMENTS

DE    197 11 701    4/1998

(Continued)

OTHER PUBLICATIONS

Japanese Office Action issued in corresponding Japanese Patent Application No. 2004-358752, dated Nov. 10, 2009.

*Primary Examiner*—Frank B Vanaman
(74) *Attorney, Agent, or Firm*—Antonelli, Terry, Stout & Kraus, LLP.

(57) ABSTRACT

In an electric drive system for a vehicle, an alternator is driven by an engine to generate electric power which is used to drive a motor to generate a driving force. During a retardation of the vehicle, the motor is operated as an alternator to convert kinetic energy to electric energy which is used to retard the vehicle. A retard resistor is provided for absorbing electric energy generated during the retardation state. The retard resistor is cooled down by an AC blower.

2 Claims, 8 Drawing Sheets

U.S. PATENT DOCUMENTS

| | | |
|---|---|---|
| 6,705,416 B1 | 3/2004 | Glonner |
| 6,917,179 B2 | 7/2005 | Komatsu et al. |
| 7,096,098 B2 * | 8/2006 | Auguet et al. ............... 701/22 |
| 7,185,591 B2 | 3/2007 | Kumar et al. |
| 7,227,273 B2 | 6/2007 | Ahmad et al. |
| 7,385,372 B2 * | 6/2008 | Ahmad et al. ............... 318/811 |
| 2002/0014872 A1 | 2/2002 | Morimoto |

FOREIGN PATENT DOCUMENTS

| | | |
|---|---|---|
| DE | 199 17 665 | 10/2000 |
| DE | 101 37 774 | 3/2002 |
| JP | 62081901 A | 4/1987 |
| JP | 62-150230 | 9/1987 |
| JP | 05-111109 | 4/1993 |
| JP | 11027806 A | 1/1999 |
| JP | 2000-115907 | 4/2000 |
| JP | 2000-224709 | 8/2000 |

* cited by examiner

ELECTRIC DRIVE SYSTEM FOR VEHICLE, ELECTRIC CONTROL SYSTEM FOR VEHICLE, ELECTRIC DRIVE METHOD FOR VEHICLE

CROSS REFERENCE TO RELATED APPLICATION

This application is a Divisional of U.S. application Ser. No. 11/297,490, filed Dec. 9, 2005, now abandoned which claims priority from Japanese Patent Application No. JP 2004-358752, filed Dec. 10, 2004, the contents of which are incorporated herein by reference.

BACKGROUND OF THE INVENTION

The present invention relates to an electric drive system for a vehicle, an electric control system for a vehicle, and an electric drive method for a vehicle.

For electrically driving a vehicle, an engine is used to generate power with which an alternator is driven to generate electric power which is used to drive a motor for moving the vehicle. Specifically, the alternator is driven by the engine to generate electric power which is then converted to a direct current (DC) by a rectifier, and the DC power is supplied to an inverter. Further, the DC input is converted to an alternate current (AC) output by the inverter, an AC motor is driven with the AC output to rotate wheels through gears, thus driving a vehicle to move.

For retarding a vehicle, the AC motor is operated as an alternator, while the inverter is operated as a converter to convert AC power to DC power. Such a technique is described, for example, in JP-A-2000-224709.

SUMMARY OF THE INVENTION

However, the prior art described above publication difficulties in absorbing energy generated during a retardation of the vehicle as the energy generated during the retardation becomes larger when the vehicle continuously runs down a long downhill.

It is an object of the present invention to provide an electric driving system for a vehicle, an electric control system for a vehicle, and an electric drive method for a vehicle which are capable of efficiently absorbing energy generated during a retardation, even if the energy generated during the retardation of vehicle is increased, for example, due to a vehicle continuously running down a long downhill road, or due to a comparative heavy vehicle.

To achieve the above object, in the present invention, an electric motor is driven to generate electric power which acts as a mechanical load on rotations of wheels. The electric power generated by the motor is converted to thermal energy by a resistor.

More specifically, a forced air-cooled retard resistor is provided for absorbing electric power resulting from a retardation. Also, an auxiliary alternator is provided coaxially with a main alternator, and an inverter associated with a blower is operated with the output of the auxiliary alternator to drive the blower for cooling down the retard resistor.

According to the present invention, since the energy generated during a retardation is converted to thermal energy which is discharged to the air by cooling, the present invention is effective particularly when the retardation is continuously applied, and can improve the driving efficiency.

Other objects, features and advantages of the invention will become apparent from the following description of the embodiments of the invention taken in conjunction with the accompanying drawings.

BRIEF DESCRIPTION OF THE DRAWINGS

FIGS. 6A and 6B represent one embodiment of method of controlling an AC blower, where

FIGS. 7A and 7B represent another embodiment of the method of controlling an AC blower, showing that the AC blower is operated after a retard as well, where FIGS. 8A and 8B represent a further embodiment of the method of controlling an AC blower, showing that the AC blower is operated before a retard as well, where

DESCRIPTION OF THE INVENTION

In the following, several embodiments of the present invention will be described with reference to the accompanying drawings.

Describing in brief the configuration of an electric drive system for a vehicle according to a first embodiment, the electric drive system comprises a blower for cooling down a retard resistor in this embodiment. The blower is driven by an associated inverter which is powered by an auxiliary alternator coaxial with a main alternator. Also, the auxiliary alternator is controlled to generate a constant output voltage irrespective of the engine rotation speed, so that the retard resistor can be cooled down under an optimal cooling condition, irrespective of the engine rotation speed and conditions under which the main alternator generates the electric power.

Figure 1:
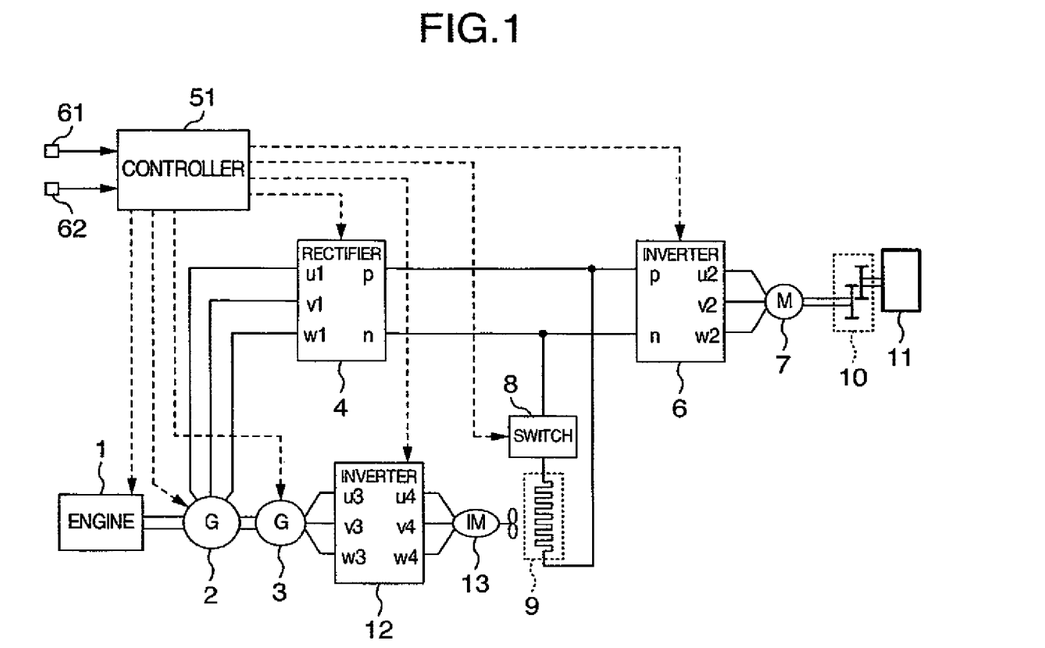
FIG. 1 is a block diagram illustrating an electric drive system for a vehicle according to one embodiment of the present invention.

Describing specifically with reference to FIG. 1, the main alternator 2 and auxiliary alternator 3 are driven by the engine 1. The output of the main alternator 2 is converted to a direct current (DC) by a rectifier 4, and the DC power is applied to an inverter 6. The inverter 6 converts the DC power to alternating current (AC) power for driving an AC motor 7. The output of the AC motor 7 is transmitted to wheels 11 to move the vehicle. On the other hand, during a retardation, the AC motor 7 is driven to act as an alternator. The inverter 6 is operated as a converter to convert AC power to DC power, and a switch 8 is turned on such that the DC power is consumed by a retard resistor 9. In other words, kinetic energy is converted to thermal energy to retard the vehicle. Also, the output of the auxiliary alternator 3 is used to operate an AC blower 13 through an inverter 12. The aforementioned retard resistor 9 is cooled down by the AC blower 13.

Figure 5:
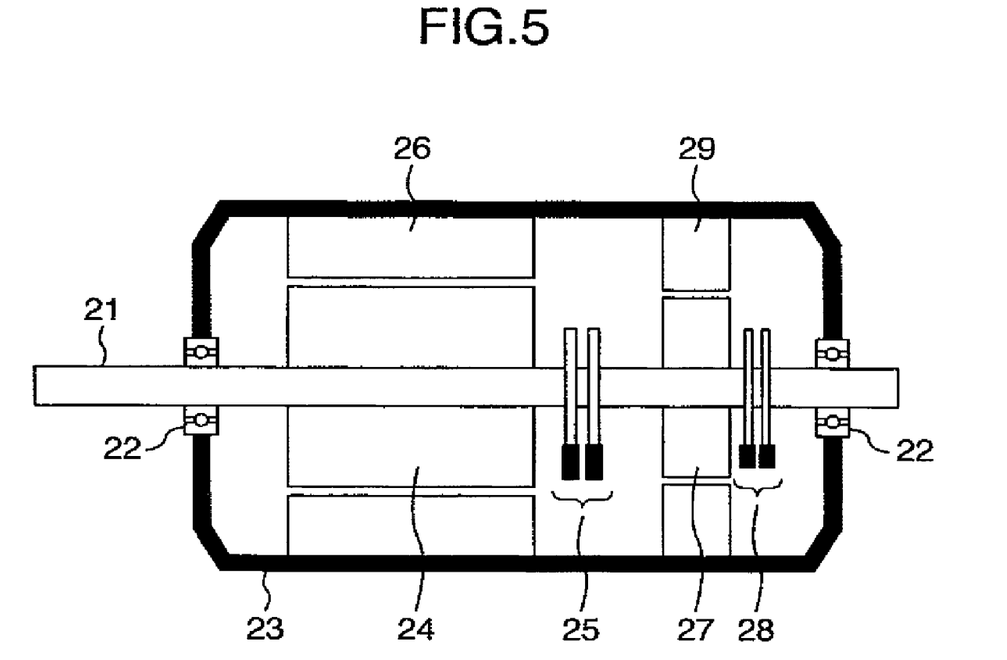
FIG. 5 represents exemplary structures of a main alternator and an auxiliary alternator in the embodiment illustrated in FIG. 1.

As illustrated in FIG. 5, the main alternator 2 and auxiliary alternator 3 can be integrated for reduction in size by arranging a rotor 24 of the main alternator and a rotor 27 of the auxiliary alternator on a single shaft 21, and placing a stator 26 of the main alternator and a stator 29 of the auxiliary alternator within a single case 23. Also, since the two alternators are electrically independent of each other, the main alternator 2 having a larger capacity can generate a higher voltage, while the auxiliary alternator 3 having a smaller capacity can generate a lower voltage. As a result, general-purpose products of low voltage insulation type can be used for the inverter 12 and associated AC blower 13.

Describing how to control the engine 1 and main alternator 2, a controller 51 obtains an accelerator position signal from an accelerator position sensor 61 and a retarding signal from a retarding detection sensor 62 thereby to produce control signals for controlling the engine 1, the main alternator 2, the auxiliary alternator 3, the rectifier 4, the inverter 6, the AC motor 7, and the switch 8 as shown in the dotted lines. In particular, a target rotation speed of the engine 1 and a target voltage of the main alternator 2 are calculated in accordance with the position of an accelerator, and the output frequency of the inverter 6 (or the AC motor 7). The engine 1 is supplied with a fuel such that the engine 1 reaches the target rotation speed. Also, an excitation current of the main alternator 2 is controlled such that the main alternator 2 outputs the target voltage. In other words, the rotation speed and alternator output voltage are controlled such that the engine 1 and main alternator 2 are driven under optimal conditions. For example, when a maximum driving force is required for the vehicle, the engine 1 is driven to reach its maximum rotation speed, and the exciting current of the alternator 2 is controlled to increase the output voltage of the alternator 2 to its maximum voltage. Conversely, when no driving force is required, the engine 1 is driven to reach its minimum speed, and the exciting current of the alternator 2 is controlled to reduce the output voltage of the alternator 2 to its minimum voltage.

The auxiliary alternator 3 in turn controls the exciting current such that the auxiliary alternator 3 generates a constant output voltage even though the engine 1 varies in the rotation speed. In this way, a retardation system can be operated regardless of the state of the driving system. For example, when the retarding pedal is depressed at the vehicle running with the maximum rotation speed of the engine, the engine speed may vary from the maximum speed to the minimum speed. At this time, the auxiliary alternator 3 is controlled to maintain the output voltage constant, and the output frequency of the inverter 12 is controlled to be constant, so that the blower 13 can make a stable cooling operation. Also, in the present invention, a constant low AC voltage can be generated from the output of the auxiliary alternator 3 irrespective of whichever state of the system. This can be utilized when an auxiliary power supply is required, such as a power supply for an in-board heater. Another advantage of this embodiment is that an effective auxiliary power supply is provided. Also, since an AC motor can be used for a motor associated with the blower for cooling the retard resistor 9, the maintenance can be facilitated for the blower, which is another advantage of the embodiment. On the other hand, the inverter 6 is controlled to reach a target torque by calculating a torque current instruction value, an exciting current instruction value, and a rotation speed instruction value based on the motor current and rotation speed of the AC motor 7.

Figure 2:
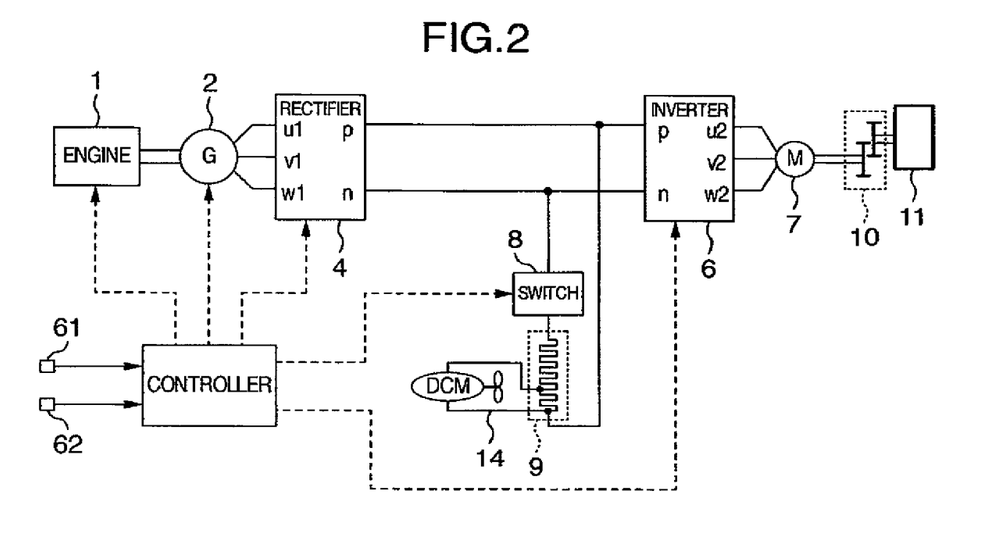
FIG. 2 is a block diagram illustrating another embodiment of the electric drive system for a vehicle using a DC blower in the present invention.

FIG. 2 illustrates another embodiment of the present invention. The following description will be given of parts different from those in the embodiment illustrated in FIG. 1. Since the remaining parts are the same as those in the embodiment illustrated in FIG. 1 in principle, no description will be given of these parts. The auxiliary alternator 3 and inverter 12 associated with the blower 13 are removed, and the AC blower 13 is replaced with a DC blower 14. The DC blower 14 is powered from an intermediate tap of the retard resistor 9. Since the auxiliary alternator and inverter associated with the blower can be omitted from the embodiment of FIG. 1, the resulting circuit can be simplified. Also, as the switch 8 is turned on to apply a voltage across the retard resistor 9, the DC blower 14 automatically rotates. On the other hand, as the switch 8 is turned off to stop applying a voltage across the retard resistor 9, the DC blower 14 automatically stops. Therefore, the blower 14 is controlled in response to the control on the switch 8, so that the control can be simplified as well.

Figure 3:
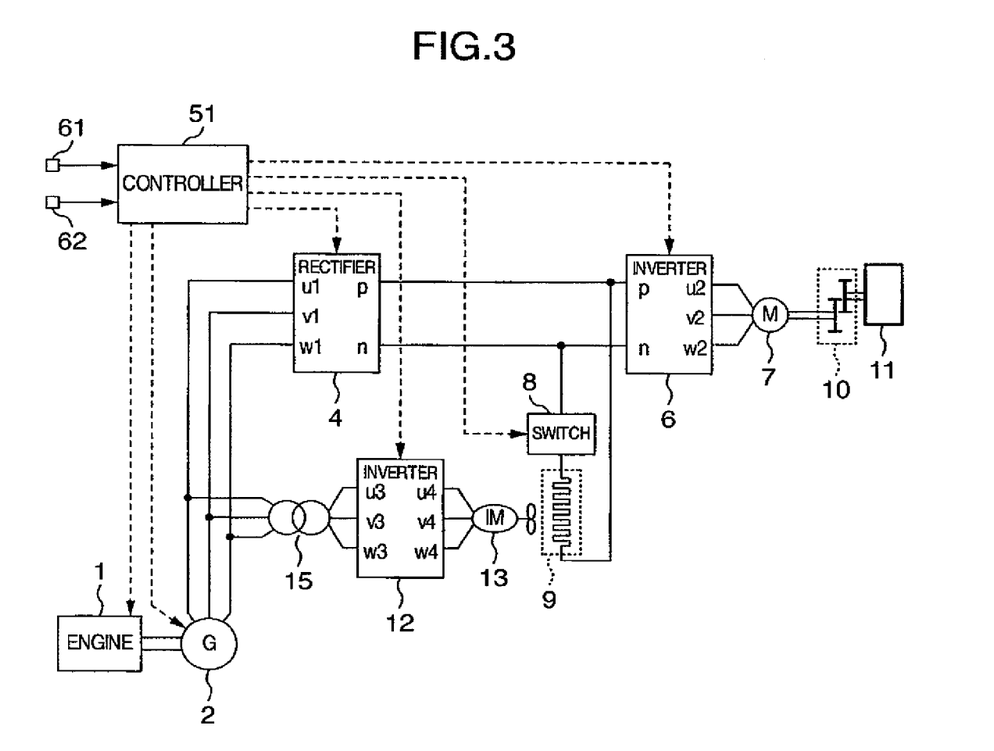
FIG. 3 is block diagram illustrating a further embodiment of the electric drive system for a vehicle using a transformer in place of an auxiliary alternator in the present invention.

FIG. 3 illustrates a further embodiment of the present invention. The following description will be given of parts different from the foregoing embodiments. The remaining parts are the same. As opposed to the embodiment of FIG. 1, the inverter 12 associated with the blower 13 is powered from the output of the main alternator 2 through a transformer 15, rather than the auxiliary alternator 3. Since the auxiliary alternator 3 can be omitted from the embodiment of FIG. 1, the cost can be reduced. Since variations in the output voltage of the main alternator results in variations in the input voltage of the inverter 12 associated with the blower 13, this embodiment is suitable for those applications which do not vary the output voltage of the main alternator 2.

Figure 4:
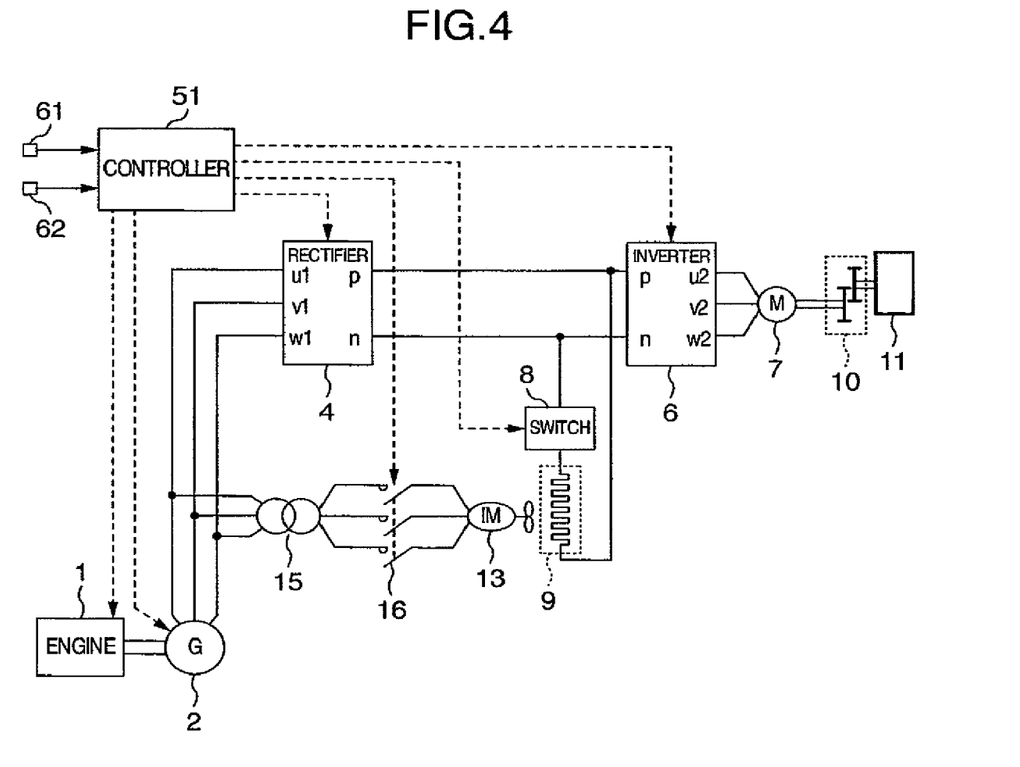
FIG. 4 is a block diagram illustrating a yet further embodiment of the electric drive system for a vehicle illustrated in FIG. 3, in which a contactor is substituted for an inverter associated with the blower in the present invention.

FIG. 4 illustrates a yet further embodiment of the present invention. The following description will be given of parts different from the foregoing embodiments. The remaining parts are the same. A contactor 16 is provided in place of the inverter 12 associated with the blower 13 in the embodiment of FIG. 3. The substitution of the contactor 16 for the inverter 12 associated with the blower 13 can result in a reduction in cost. However, since the AC blower 13 is applied with a voltage proportional to the output voltage of the main alternator 2 at the same frequency as the output frequency of the main alternator 2, this embodiment is suitable for those applications which do not fluctuate the output voltage or output frequency of the main alternator 2.

Figure 6A:
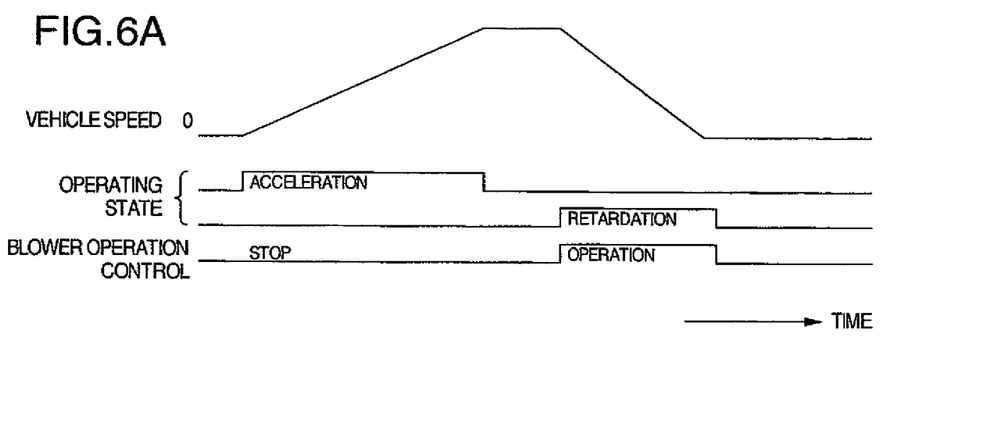
FIG. 6A is a timing chart.
Figure 6B:
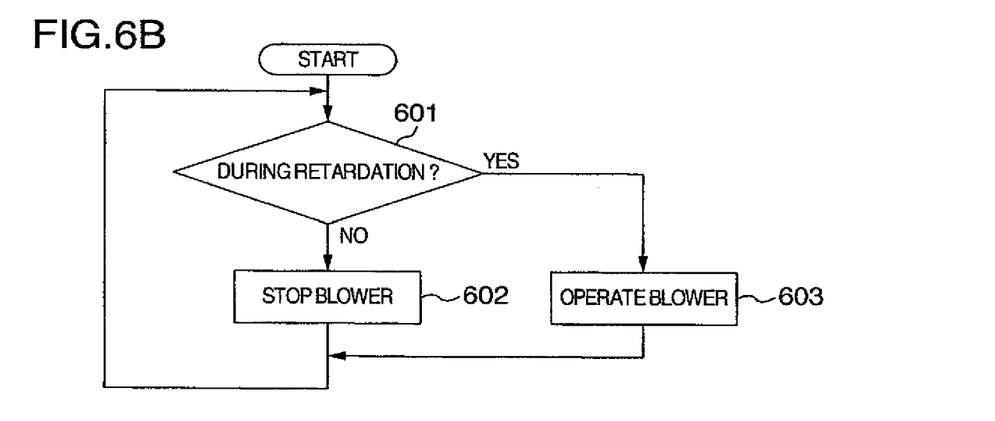
FIG. 6B is a flow chart illustrating the flow of operations in the control method.

FIGS. 6A and 6B represent one embodiment of a method of controlling the AC blower 13 in the embodiments illustrated in FIGS. 1, 3, and 4. At step 601, it is determined whether or not the vehicle is in retarding state. The controller 51 determines the vehicle is in the retardation state or not based on the signal from retarding detection sensor 62 disposed on the retard pedal. When the vehicle is in retarding state, the inverter 12 associated with the blower 13 in FIG. 1, for example, is operated to drive the blower 13 at step 603 by applying a control signal to the inverter 12 from the controller 51. On the other hand, when the vehicle is not in retard state, the inverter 12 associated with the blower 13 in FIG. 1, for example, is stopped to stop the blower 13. While the foregoing description has been given in connection with the inverter 12 associated with the blower 13 in FIG. 1, similar operations can be performed in the configurations of FIGS. 3 and 4, as a matter of course. In this embodiment, the AC blower 13 is operated only during a retard. The efficiency can be increased because the AC blower 13 can be operated only for a minimally required time.

Figure 7A:
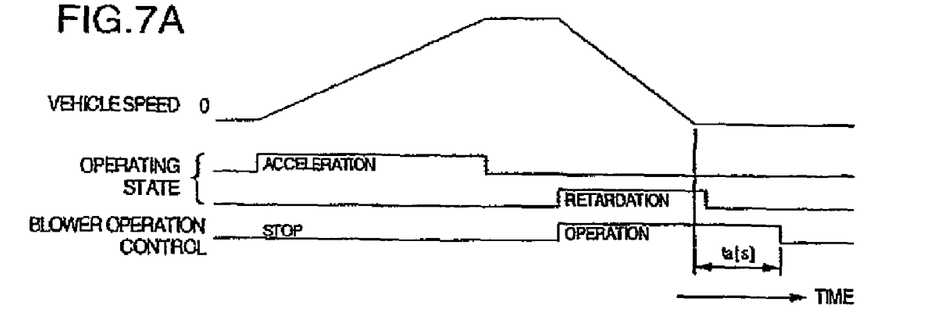
FIG. 7A is a timing chart.
Figure 7B:
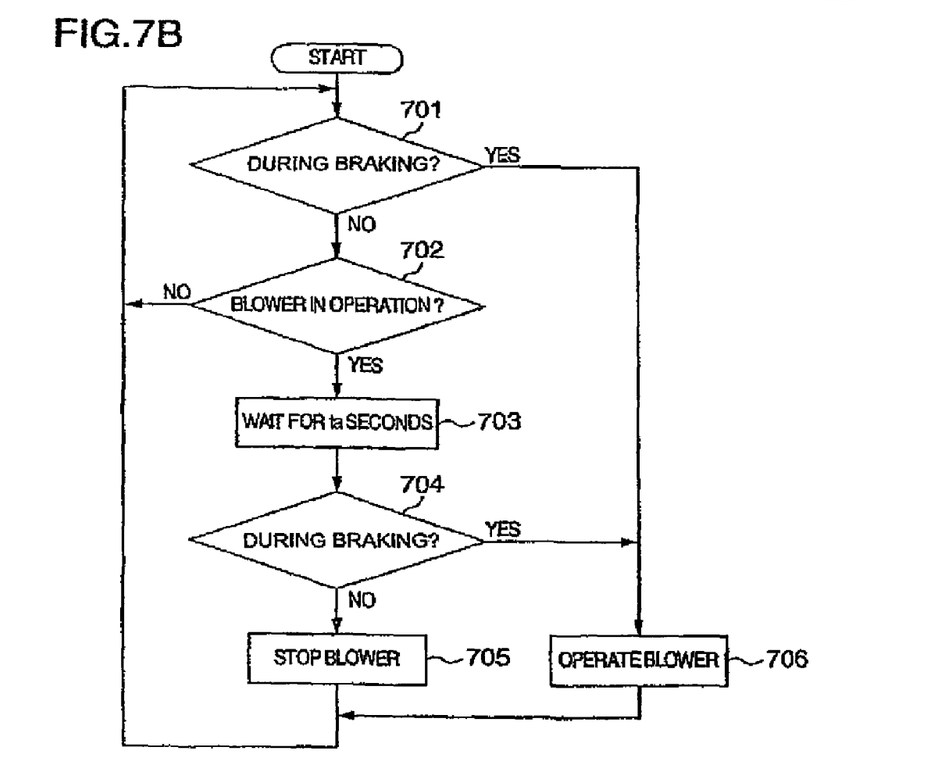
FIG. 7B is a flow chart illustrating the flow of operations in the control method.

FIGS. 7A and 7B represent another embodiment of the method of controlling the AC blower 13 in the embodiment illustrated in FIG. 4. Explanation will be made only for the portions of the further embodiment different from the aforementioned embodiments. At step 701, it is determined whether or not the vehicle is in retard state. When the vehicle is in retard state, the inverter 12 associated with the blower 13 in FIG. 1, for example, is operated to drive the blower 13 at step 706. On the other hand, when the vehicle is not in retard state, it is determined at step 702 whether or not the blower 13 is in operation. When the blower 13 is not in operation, the flow returns to step 701. On the other hand, when the blower 13 is in operation, the flow waits for a time ta (seconds) at step 703. Then, it is determined again at step 704 whether or not the vehicle is in retard state. When in retard state, the inverter 12 associated with the blower 13 in FIG. 1, for example, is operated to drive the blower 13 at step 706. When not in retard state, the inverter 12 associated with the blower 13 in FIG. 1, for example, is stopped to stop the blower 13 at step 705. While the foregoing description has been made in connection with the inverter 12 associated with the blower 13 in FIG. 1, similar operations can be performed in the configurations of FIGS. 3 and 4, as a matter of course. In this embodiment, the AC blower 13 is operated not only during the retardation period but also for a certain time (ta in FIG. 7A) after the retard has been finished. By operating the blower 13 after the retarding operation has been finished, and even after heat generation of the retard resistor 9 has been finished, the heat remaining in the retard resistor 9 can be removed to prevent abnormal heating after the end of the retard. In this way, a longer lifetime can be expected for the retard resistor 9.

Figure 8A:
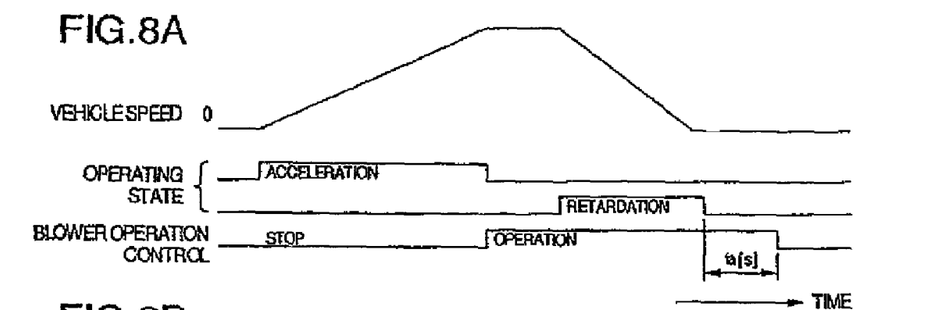
FIG. 8A is a timing chart.
Figure 8B:
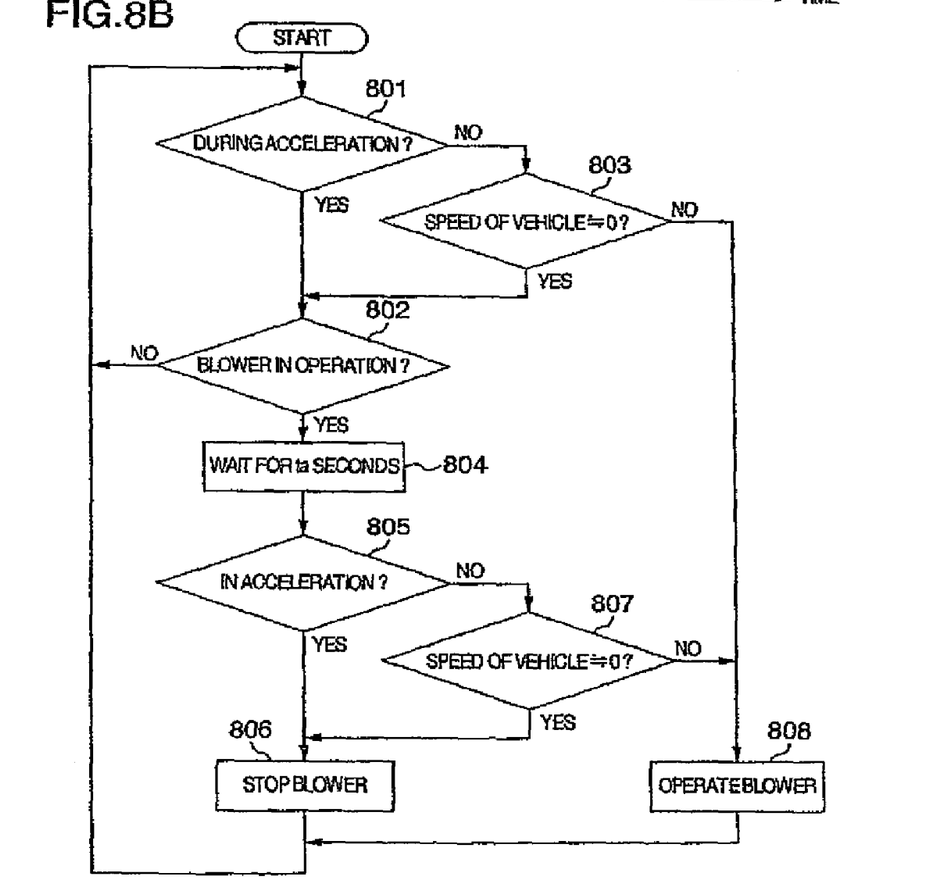
FIG. 8B is a flow chart illustrating the flow of operations in the control method.

FIGS. 8A and 8B represent a further embodiment of the method of controlling the AC blower 13 in the embodiments illustrated in FIGS. 1, 3, and 4. Explanation will be made only for the portions of the further embodiment different from the afore-mentioned embodiments. At step 801, it is determined whether or not the vehicle is in acceleration state. When in acceleration, it is determined at step 803 whether or not the speed of the vehicle is substantially zero. If the speed of the vehicle is not substantially zero, the inverter 12 associated with the blower 13 in FIG. 1, for example, is operated to drive the blower 13 at step 803.

Conversely, when it is determined at step 801 that the vehicle is not in acceleration state, or when it is determined at step 803 that the vehicle speed is substantially zero, the flow proceeds to step 802. The vehicle speed is calculated based on the rotation speed of the AC motor 10 detected by a rotation sensor (not shown), the gear ratio and the wheel diameter. It is determined at step 802 whether or not the blower 13 is in operation. When not in operation, the flow returns to step 801. On the other hand, when the blower 13 is in operation, the blower 13 is left operated for a time ta (seconds) at step 804. Then, it is determined again at step 805 whether or not the vehicle is in acceleration state. That is, it is determined as the acceleration state when the acceleration value is more than a predetermined value. The acceleration value may be calculated by differentiate the vehicle speed. When in acceleration, it is determined at step 807 whether or not the vehicle speed is substantially zero. When the vehicle speed is not substantially zero, the inverter 12 associated with the blower 13 in FIG. 1, for example, is operated to drive the blower 13 at step 808. On the other hand, when the speed of the vehicle is substantially zero, the inverter 12 associated with the blower 13 in FIG. 1, for example, is stopped to stop the blower 13 at step 806. Conversely, when it is determined at step 805 that the vehicle is not in acceleration state, the blower 13 is stopped at step 806 in a similar manner.

While the foregoing description has been made in connection with the inverter 12 associated with the blower 13 in FIG. 1, similar operations can be performed in the configurations of FIGS. 3 and 4, as a matter of course.

In this embodiment, the AC blower 13 is operated when the vehicle is not in acceleration state and when the speed of the vehicle is not substantially zero. Also, the AC blower 13 is stopped after it is operated for a certain time (ta in FIG. 8B) when the vehicle gets off the condition of no acceleration state with the vehicle speed in substantially zero. In this embodiment, the AC blower 13 starts the operation at the time the acceleration state is terminated. Therefore, the AC blower 13 has begun the rotation at the time the retarding operation is started. In this way, it is possible to improve a shortage of air due to a delay in the start of the rotation of the blower 13 when the retarding operation is started. Also, by operating the blower 13 even after the retarding operation is terminated and the retard resistor 9 no longer generates heat, heat remaining in the retard resistor 9 can be removed to prevent abnormal heating after the end of the retard. From the foregoing, the lifetime of the retard resistor is expected to become longer.

While the foregoing description has been given of an embodiment in which gears 10 are interposed between the AC motor 7 and the wheels 11, the present invention can also be applied to a direct drive system which omits the gears 10.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An electric drive system for a vehicle, comprising:
   an alternator system driven by power of an engine of said vehicle to generate electric power, said alternator system having at least two stators of a first alternator and a second alternator which are coaxially connected to an output shaft of said engine, wherein said second alternator is controlled to generate a constant voltage independently of an engine rotation speed;
   a rectifier for rectifying a first electric power output from said first alternator;
   a first converter for converting an output of said rectifier to an alternating current;
   a motor driven by an output of said first converter, said motor being rotatable by wheels of said vehicle through a mechanical coupling to generate electric power;
   a resistor for converting the electric power generated by said motor to thermal energy;
   a second converter for converting a second electric power output from said second alternator to an alternating current having arbitrary frequency and voltage; and
   a blower for cooling said resistor, driven by an output from said second converter,
   wherein said system determines whether or not said vehicle is accelerating,
   if the vehicle is not accelerating and a vehicle speed is not less than a predetermined value, said resistor is cooled down with the blower,
   if the vehicle is not accelerating and a vehicle speed is less than a predetermined value, or is in acceleration, the cooling of resistor is stopped after waiting for a predetermined time,
   a driving of said blower is started from a stopped state of said blower prior to a start of braking operation of the vehicle, and
   after the braking operation is terminated the driving of said blower is continued in a predetermined time period the driving of said motor is stopped, and after that the driving of said blower is stopped.

2. An electric drive system according to claim 1, further comprising wheels mechanically coupled to said motor.

* * * * *